Dec. 15, 1959  W. HÜTTER ET AL  2,917,121

TRAILERS

Filed March 19, 1957  2 Sheets-Sheet 1

INVENTOR
Wolfgang Hütter &
Kaspar Ritter

BY Michael S. Striker
agt.

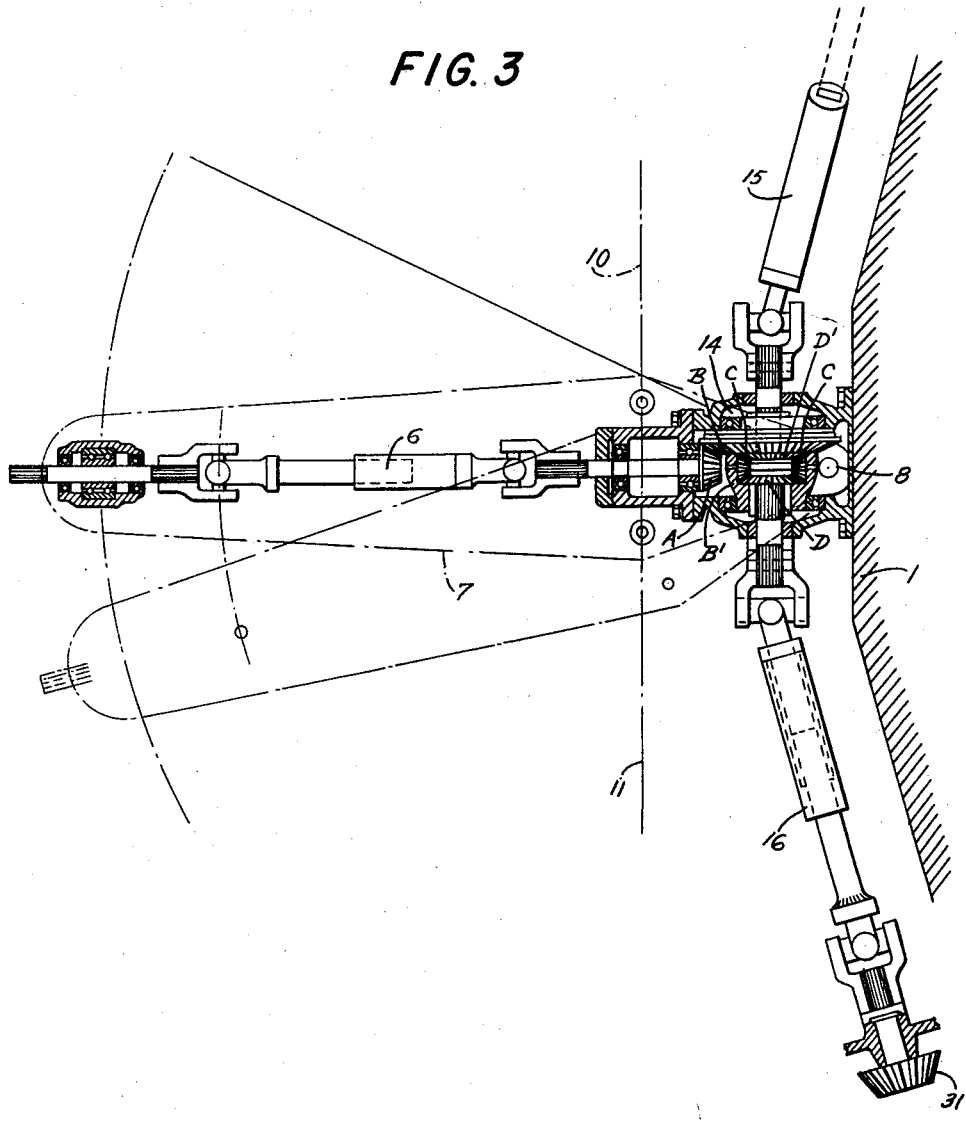

United States Patent Office 2,917,121
Patented Dec. 15, 1959

2,917,121

TRAILERS

Wolfgang Hütter, Bezgenrieth, Wurttemberg, Austria, and Kaspar Ritter, Kirchheim, Teck, Germany, assignors to Allgaier-Werke G.m.b.H., Uhingen, Wurttemberg, Germany Application March 19, 1957, Serial No. 647,123

4 Claims. (Cl. 180—14)

The present invention relates to trailers.

More particularly, the present invention relates to trailers having at least four wheels each of which is positively driven.

Trailers of the above type raise certain problems because when the drive goes to at least four of the wheels a great amount of space is required beneath the floor of the trailer to accommodate the structure for transmitting the drive to the wheels of the trailer, and in particular differentials and the like which are arranged beneath the floor of the trailer extend through a considerable height, so that a great limitation is placed on the extent to which the floor of the trailer may be lowered. That is, with such constructions it is not possible to locate the floor of the trailer as close to the surface on which the trailer rides as might be desired for certain special purposes.

One of the objects of the present invention is to provide a trailer construction of the above type where at least four of the trailer wheels are directly driven and which at the same time enables the floor of the trailer to be located as close as desired to the surface on which the trailer rides.

An additional object of the present invention is to provide a trailer with means for transmitting drives to at least four of the wheels thereof in such a way that the distances through which the drive transmitting means extend change very little even during the turning of steering wheels of the trailer.

A further object of the present invention is to provide a construction capable of accomplishing the above objects and at the same time composed of simple and ruggedly constructed elements which are very reliable in operation.

With the above objects in view, the present invention mainly consists of a trailer which includes a pair of front steering wheels and at least one additional pair of rear wheels. A floor is carried by these wheels and is adapted to support a load of the trailer. A drive transmitting means extends along the front of the trailer ahead of the floor thereof and along the sides of the trailer for transmitting a drive from the vehicle in front of the trailer to the front steering wheels thereof as well as to the additional pair of wheels thereof, and this arrangement of the drive transmitting means keeps the space beneath the floor completely free so that this floor may be located as close as desired to the surface on which the trailer rides. Furthermore, by locating a pair of differentials of the drive transmitting means respectively adjacent to the front steering wheels and respectively over the steering axes thereof, it is possible to provide a construction where the length of the drive transmitting means varies to a minimum during turning of the steering wheels.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 3 is a fragmentary plan view diagrammatically illustrating part of the drive used with the structure of the present invention.

Figure 1:
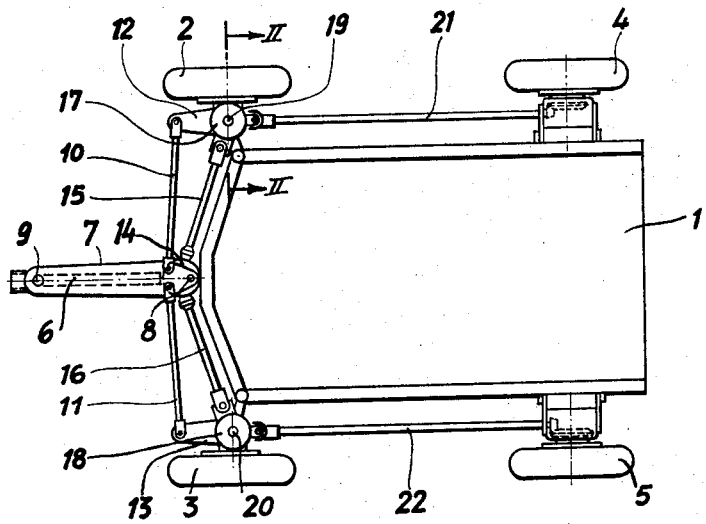
Fig. 1 is a diagrammatic top plan view of a trailer according to the present invention.

Referring now to Fig. 1 of the drawings, it will be seen that the trailer illustrated therein includes a floor 1 which is adapted to carry the load of the trailer. A pair of front steering wheels 2 and 3 are interconnected with the floor and are respectively turnable about predetermined axes so as to be capable of steering the trailer when it negotiates a turn. An additional pair of wheels 4 and 5 are respectively located behind the wheels 2 and 3. These wheels 4 and 5 are also interconnected by a suitable means with the floor 1 so as to support the latter.

A suitable drive transmitting means is provided for transmitting a drive from a vehicle in front of the trailer to all of the wheels 2–5. This drive transmitting means includes a drive shaft 6 which is diagrammatically shown in Fig. 1 and which is adapted to be connected at its front end to a drive from a vehicle in front of the trailer of Fig. 1. A bar 7 is located over the drive shaft 6 and is pivotally connected at 8 to the front end of the floor 1 or to a front wall of the trailer affixed to and extending upwardly from the floor 1. This bar 7 includes at its front end an opening 9 adapted to receive a pin fixed to a suitable connecting bar extending from the vehicle which is in front of the trailer shown in Fig. 1 and from which the drive for the wheels 2–5 is derived.

A pair of links 10 and 11 are respectively connected pivotally to the bar 7, and at their ends which are distant from the bar 7 these links 10 and 11 are respectively connected pivotally to a pair of steering levers 12 and 13 which are interconnected with the wheels 2 and 3, respectively, so that when the bar 7 turns to the right or left the wheels 2 or 3 will also turn so as to assist in steering the trailer.

The drive shaft 6 is operatively connected to a drive distributing means 14 which is in turn operatively connected to a pair of drive shafts 15 and 16 of a pair of drive transmitting means. Operation of the drive shaft 6 revolves bevel pinion A which drives a large annular bevel gear B. The bevel gear B is secured to casing B' which contains differential gearing. As this casing B' revolves together with gear B it carries around with it a spider upon which are mounted the pinions C. These pinions C are free to turn in bearings formed on the arms of the spider, and mesh with the bevel gears D and D' which in turn are connected with the drive shaft 16 and the drive shaft 15, respectively. The drive distributing means may include any suitable combination of gears for causing the rotating drive shaft 6 to simultaneously rotate the shafts 15 and 16 at equal speeds and in the same direction. The details of the drive shaft 6 and drive distributing means 14 are shown in Fig. 3. The shafts 15 and 16 are interconnected through suitable universal joints with a pair of differential means 17 and 18, respectively, this pair of differential means being located adjacent to the front steering wheels 2 and 3, respectively, as is apparent from Fig. 1. As is diagrammatically shown in Fig. 1, the pair of differential means 17 and 18 are respectively in driving engagement with shafts 19 and 20 which in turn form parts of a pair of drive transmitting means for transmitting drives from the pair of differential means 17 and 18 to the pair of front steering wheels 2 and 3, respectively. Also, a pair of elongated drive transmitting means 21 and 22 respectively extend from the pair of differential means 17 and 18 to the rear wheels 4 and 5, respectively, for transmitting the drive from the pair of differential means 17 and 18 to the pair of rear wheels 4 and 5. As is apparent from Fig. 1, the front ends of the pair of drive transmitting means 21 and 22 are in the form of universal joints interconnected with the pair of differential means 17 and 18, and the rear ends of the pair of drive transmitting means are in the form of pairs of bevel gears operatively connected to the wheels 4 and 5.

Figure 2:
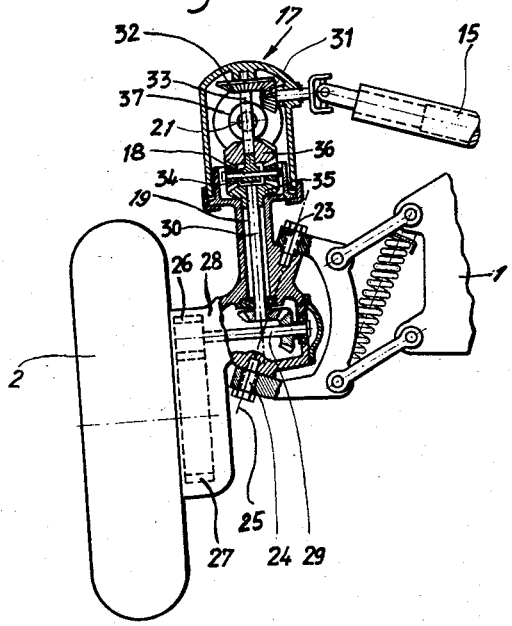
Fig. 2 is an enlarged partly sectional elevational fragmentary view taken along line II—II of Fig. 1 in the direction of the arrows.

Fig. 2 shows in detail how the floor 1 is interconnected with the wheel 2 as well as how the differential means 17 is interconnected with the drive shaft 15 and with the pair of drive transmitting means for transmitting the drive from the differential means 17 to the wheel 2 as well as to the wheel 4. The structure associated with the wheel 3 is identical with that shown in Fig. 2 and is symmetrically arranged with respect to the structure of Fig. 2.

As may be seen from Fig. 2 the floor 1 is suitably interconnected with a bracket turnably connected to a pair of pivot pins 23 and 24 which define the turning axis 25 of the front wheel 2. These pivot pins 23 and 24 are connected to the housing 28 of the drive of the front wheel 2, and elements 12 and 13 are respectively fixed to housings 28.

A pair of meshing gears 26 and 27 form part of the drive for the front wheel 2, and the gear 26 is fixed to a shaft 29 which through a pair of bevel gears is driven by a vertical shaft 30.

The drive shaft 15 is interconnected through a universal joint with a pair of bevel gears 31 and 32 which mesh with each other, and the bevel gear 32 is fixed to a vertically extending shaft 33 which is in turn connected to the spider of the pair of planetary gears 34 of the differential means 17. These planetary gears 34 mesh with the pair of sun gears 35 and 36, and the sun gear 35 is fixed to the shaft 30, so that in this way the drive is transmitted from the differential means 17 through the shaft 30, the bevel gears interconnecting the shaft 30 with the shaft 29, and through the gears 26 and 27 to the wheel 2.

The planetary gears 34 also are in operative engagement with the sun gear 36 which is formed at its upper face as a bevel gear which meshes with another bevel gear 37 which is interconnected with the drive transmitting means 21 through the universal joint shown diagrammatically at the left end of the drive transmitting means 21 in Fig. 1. It will be noted from Fig. 2 that the axis of the shaft 30 intersects the turning axis 25 of the wheel 2 at a predetermined point. By arranging the differential means 17 in the manner shown in Fig. 2 so that it is located over the turning axis 25 of the wheel 2, the changes in length of the drive transmitting means 21 as well as of the drive transmitting means 15 during turning of the wheel 2 can be reduced to a minimum, and in fact if a very precise construction is provided, although such a precise and fairly complex construction is rather expensive, it is possible to completely eliminate any changes in the length of the drive transmitting means 15 and 21. The same is also true, of course, of the drive transmitting means 16 and 22 which are associated with the wheel 3.

In order to take care of the slight changes in length of the several drive transmitting means which occur during turning of the wheels, the ends of the elongated drive transmitting means may include splined shafts whose axial projections slidably extend into axial grooves formed in elongated hollow shafts which form the elongated shaft of the drive transmitting means. In other words, referring to Fig. 2, the end of the drive transmitting means 15 shown therein may include an elongated hollow shaft which at its left end is formed with splined grooves, and a relatively short shaft which is matingly splined with these splined grooves extends from the hollow shaft to the universal joint to which it is connected. In this way it is possible for the lengths of the several drive transmitting means to change to the desired extent during the turning of the wheels.

It will be noted that with the structure of the invention the entire drive transmitting means described above is arranged ahead of the floor 1 and along the sides thereof, so that the space beneath the floor 1 is completely free, and it is therefore possible to locate the floor 1 as close as desired to the surface on which the wheels 2–5 ride.

It will be understood that each of the elements described above, or two or more together, may also find a useful application in other types of trailers differing from the types described above.

While the invention has been illustrated and described as embodied in trailers having independently driven wheels, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a trailer, in combination, a pair of front steering wheels and at least one additional pair of wheels located to the rear of said steering wheels; a floor carried by said wheels and adapted to support a load; a pair of differential means respectively located adjacent said pair of front steering wheels; first drive transmitting means located in front of said floor for receiving a drive from a vehicle in front of the trailer and for transmitting the drive to said pair of differential means; a pair of second drive transmitting means respectively extending from said pair of differential means to said pair of front steering wheels for driving the latter, respectively; and a pair of third drive transmitting means respectively extending from said pair of differential means respectively along opposite sides of said floor to said additional pair of wheels, respectively, for transmitting a drive from said pair of differential means to said pair of additional wheels, respectively, so that the space beneath said floor is free to enable said floor to be located as close as desired to a surface on which said wheels ride.

2. In a trailer, in combination, a pair of front steering wheels respectively turnable about a pair of predetermined axes for steering the trailer; at least one pair of additional wheels located to the rear of said front steering wheels; a floor carried by said wheels and adapted to support a load; a pair of differential means respectively located adjacent said front pair of steering wheels and respectively located over said predetermined axes; first drive transmitting means located in front of said floor and operatively connected to said pair of differential means for transmitting a drive from a vehicle in front of said trailer respectively to said pair of differential means; a pair of second drive transmitting means respectively extending from said pair of differential means to said pair of front steering wheels for transmitting a drive thereto; and a pair of third drive transmitting means respectively extending from said pair of differential means to said additional pair of wheels for transmitting a drive to the latter, said first, second, and third drive transmitting means all being located away from the space beneath said floor so that the latter can be located as close as desired to a surface on which said wheels ride.

3. In a trailer, in combination, a pair of front steering wheels and at least one additional pair of wheels located to the rear of said front wheels; a floor carried by said wheels and adapted to support a load; a drive shaft located ahead of said floor at a substantially central portion of the trailer and adapted to receive a drive from a vehicle in front of the trailer; a first pair of drive transmitting means respectively extending from a central portion of said trailer ahead of said floor in opposite lateral directions toward said pair of front steering wheels; drive distributing means operatively connected to said drive shaft and said first pair of drive transmitting means for transmitting the drive from said drive shaft to said first pair of drive transmitting means; a pair of differential means respectively located adjacent said front pair of wheels and respectively connected operatively to said first pair of drive transmitting means to be driven thereby; a pair of second drive transmitting means respectively extending from said pair of differential means to said front pair of wheels for driving the latter; and a pair of third drive transmitting means extending from said pair of differential means respectively along opposite sides of said floor to said additional pair of wheels for transmitting a drive from said pair of differential means respectively to said additional pair of wheels, so that the space beneath said floor is clear to enable the latter to be located as close as desired to a surface on which said wheels ride.

4. In a trailer, in combination, a pair of front steering wheels and at least one pair of additional wheels located to the rear of said front wheels; a floor adapted to carry a load; connecting means interconnecting said pair of front steering wheels with said floor for supporting said floor on said front steering wheels and for mounting said front steering wheel for respective turning movement about a pair of axes which are inclined with respect to each other; additional connecting means interconnecting said floor with said additional pair of wheels so that the latter also contributes to the support of said floor; a pair of differential means respectively located over said turning axes of said front wheels; first drive transmitting means located ahead of said floor and extending between said pair of front wheels for transmitting to said pair of differential means a drive from a vehicle in front of the trailer; a pair of second drive transmitting means respectively extending from said pair of differential means to said pair of front wheels for transmitting a drive from said pair of differential means respectively to said pair of front wheels; and a pair of third drive transmitting means respectively extending along opposite sides of said floor from said pair of differential means respectively to said pair of additional wheels for transmitting a drive from said pair of differential means to said additional pair of wheels, so that the space beneath said floor is clear to enable said floor to be located as close as possible to a surface on which said wheels ride.

References Cited in the file of this patent

UNITED STATES PATENTS

| | | |
|---|---|---|
| 820,709 | Durkee | May 15, 1906 |
| 826,940 | Ingram | July 24, 1906 |
| 855,597 | Thorp | June 4, 1907 |
| 1,207,663 | Thomason | Dec. 5, 1916 |
| 1,322,335 | Petersen | Nov. 18, 1919 |
| 1,436,999 | McLarty | Nov. 28, 1922 |
| 2,800,188 | Garrett | July 23, 1957 |
| 2,822,055 | Ludowici | Feb. 4, 1958 |

FOREIGN PATENTS

| | | |
|---|---|---|
| 462,709 | France | Nov. 28, 1913 |
| 961,585 | France | Nov. 21, 1949 |